United States Patent [19]

Bledsoe et al.

[11] Patent Number: 4,955,012
[45] Date of Patent: * Sep. 4, 1990

[54] SEISMIC STREAMER CABLE

[75] Inventors: Steven W. Bledsoe; Alan D. McMurry, both of Friendswood, Tex.

[73] Assignee: Western Atlas International, Inc., Houston, Tex.

[*] Notice: The portion of the term of this patent subsequent to Feb. 28, 2006 has been disclaimed.

[21] Appl. No.: 281,858

[22] Filed: Dec. 9, 1988

Related U.S. Application Data

[63] Continuation-in-part of Ser. No. 121,271, Nov. 16, 1987, Pat. No. 4,809,243, which is a continuation of Ser. No. 915,060, Oct. 3, 1986, abandoned.

[51] Int. Cl.$^5$ ............................................. G01V 1/38
[52] U.S. Cl. ..................................... 367/154; 367/20; 367/155; 367/149
[58] Field of Search ................. 367/20, 106, 130, 149, 367/153, 154, 155, 171, 173, 176; 114/253, 254; 174/101.5; 181/110–112

[56] References Cited

U.S. PATENT DOCUMENTS

| | | | |
|---|---|---|---|
| 2,825,039 | 2/1958 | Schurman et al. | 367/154 X |
| 3,375,324 | 3/1968 | Miller | 174/101.5 |
| 3,434,104 | 3/1969 | Stapleton et al. | 367/154 |
| 3,480,907 | 11/1969 | King | 367/154 |
| 3,739,326 | 6/1973 | Kerr et al. | 367/159 |
| 3,744,016 | 7/1973 | Davis | 367/154 |
| 3,900,543 | 8/1975 | Davis | 367/154 X |
| 4,295,212 | 10/1981 | Swenson | 367/20 |
| 4,471,474 | 9/1984 | Field | 367/149 |
| 4,477,887 | 10/1984 | Berni | 367/20 |
| 4,491,939 | 1/1985 | Carpenter | 367/154 X |
| 4,570,248 | 2/1986 | Assard | 367/153 X |
| 4,809,243 | 2/1989 | Bledsoe et al. | 367/154 |

FOREIGN PATENT DOCUMENTS

| | | | |
|---|---|---|---|
| 2838577 | 3/1979 | Fed. Rep. of Germany | 174/47 |
| 2145226 | 3/1985 | United Kingdom | 367/20 |

Primary Examiner—Brian S. Steinberger
Attorney, Agent, or Firm—Barry C. Kane

[57] ABSTRACT

A streamer-cable assembly is provided having a tubular outer jacket enclosing an open-cell and closed-cell foam core. The foam core provides an axial hole for retaining a plurality of pressure sensors and a plurality of off-axial holes providing passages for the transmission bundle. Longitudinal channels along the exterior of the foam inserts receive substantially rigid stress members which provide longitudinally strength to the streamer. Cable noise associated with the cable jerk and cable whip/vibration is radially reduced by the open-cell foam core and rigid stress members while the closed-cell foam core provides buoyancy to the streamer cable at the connectors between sections.

14 Claims, 2 Drawing Sheets

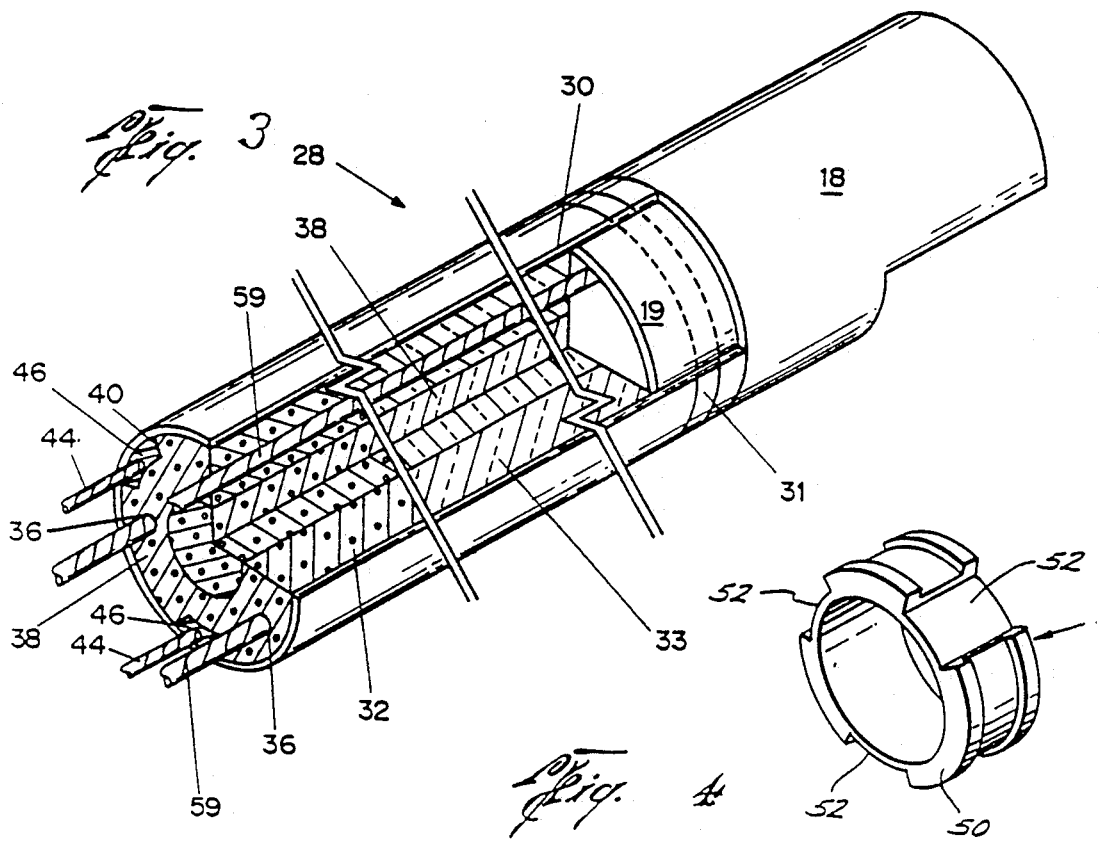
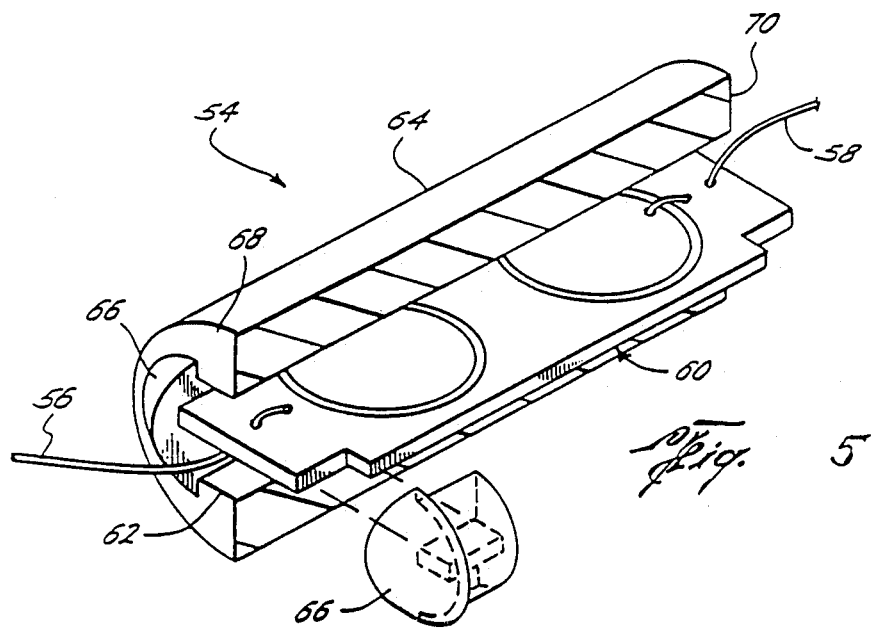

SEISMIC STREAMER CABLE

CROSS-REFERENCE TO RELATED APPLICATIONS

This is a continuation-in-part of Ser. No. 121,271, filed Nov. 16, 1987, now U.S Pat. No. 4,809,243, which is a continuation of Ser. No. 915,060, filed Oct. 3, 1986, now abandoned.

BACKGROUND OF THE INVENTION

1. Field of the Invention

This invention relates to apparatus used to detect pressure waves propagating through a fluid and particularly to a low-noise streamer cable having improved buoyancy compensation.

2. Description of the Related Art

A conventional streamer cable used in seismic exploration may consist of a water-tight jacket enclosing a plurality of pressure sensors disposed at known intervals, depth transducers, and electrical and optical conductors extending through a series of bulkheads. The bulkheads also receive and are anchored to a plurality of steel or nylon stress members extending therethrough. The stress members absorb the strain of towing, thus preventing the cable jacket from stretching and eventually rupturing. The bulkheads provide a cylindrical shape to the streamer cable jacket, separate the stress members from each other, and may be used to protect the enclosed pressure sensors. The streamer cable often is filled with a noncorrosive light kerosene to provide neutral buoyancy while in the water. A few streamer cable designs have employed a closed-cell isocyanurate foam to provide buoyancy and to protect the enclosed sensors from crushing impacts, but closed-cell structure streamer cables are restricted to limited depths of operation.

Conventional streamer cables suffer from substantially high amounts of background noise while under tow. Movement of the streamer cable through the water may result in cable noise on the order of 5 to 10 microvolt. A percentage of this noise may be attributed to sources away from the cable such as the propellers of the ship and the breaking waves in a rough sea. The remainder of the noise is generated by weights and depth controllers attached to the outside of the cable used to attain and maintain a common depth for the length of the cable.

Two mechanisms are generally believed to be responsible for cable-generated noise. In the first mechanism, the cable is subject to irregular towing tension resulting in cable jerk. Shock from cable jerk propagates along the stress members to the bulkheads which in turn generate pressure waves in the cable oil. The pressure waves propagate along the length of the cable section with the cable jacket acting as a wave guide. Rarefractional waves also develop within the cable. The multiplicity of pressure waves and/or rarefractional waves (hereafter called tube waves) are detected by the enclosed pressure sensors as background noise. The second mechanism for generating cable noise may result from objects outside the cable or from the cable moving laterally to the towing direction. That is to say the cable may whip or vibrate; the motion having a range of amplitudes and wave lengths. Cable whip causes the cable jacket to shift about the bulkheads causing vibration to be transferred to the cable oil. Additionally, the cable jacket may impact one or more of the stress members thus generating a pulse which is detected by the sensors. In addition to cable whip, cable noise is generated by vibration of the stress members. Cable jerk pulls the stress members taught from the relaxed position, setting them to vibrate and generate noise.

It is preferred that a streamer cable have substantially zero background noise while in tow, but if this is not readily attainable, it is most desirable to reduce background noise as much as possible.

SUMMARY OF THE INVENTION

It is a primary object of this invention to provide a lownoise streamer cable.

It is another object of this invention to provide a streamer cable having a greater longitudinal rigidity to reduce cable whip and vibration.

It is yet another object of this invention to provide a streamer cable which is substantially incapable of having tube waves propagate therein.

It is yet another object of this invention to substantially reduce the need for external ballast or depth controlling devices to control the tow depth of the streamer cable.

The instant invention may have a flexible tubular jacket enclosing a plurality of pressure sensors disposed at known intervals along its length, all interconnected to a recording and control unit aboard a towing vehicle by a transmission bundle. A unitary, open cell foam insert may be enclosed within the jacket and enclose the plurality of pressure sensors so as to physically locate each along the axis of the cable. A plurality of off-axial holes each extending the length of the inset contain a transmission bundle. Located at each end of the streamer cable within the cable jacket, and proximate the end connectors, may be a closed cell foam core insert. The closed cell insert contains the same holes as extending through the open cell insert described above.

A plurality of rigid stress members are longitudinally disposed within the jacket and exterior the insert, each containing a steel or nylon cable extending the length thereof. Disposed around the inserts and inside of the stress members at known intervals may be an annular locator for maintaining the radial position of each stress member and assist in maintaining the cylindrical shape of the cable.

The pressure sensors may each have a polyvinylchloride (PVC) housing which may support the sensor within the foam insert. The polyurethane inserts, stress members and PVC cable jacket and sensor housing all act in concert to dampen tube waves and spurious pressure pulses resulting from cable movement, as well as provide a more stable cable profile in the water as it is towed. The low cable profile improves the laminar fluid flow adjacent the cable exterior and reduces cable noise.

BRIEF DESCRIPTION OF THE FIGURES

A better understanding of the benefits and advantages of my invention may be obtained from the appended detailed description and the drawings, wherein:

FIGS. 2 and 3 are isometric quarter cross-sections illustrating a portion of a seismic streamer cable employing an embodiment of this invention;

FIG. 4 is an isometric view of a locator which may be used in this invention;

FIG. 5 is an isometric view in partial cross section illustrating one embodiment of a pressure-sensor assembly which may be employed in this invention.

DETAILED DESCRIPTION OF A PREFERRED EMBODIMENT

Figure 1:
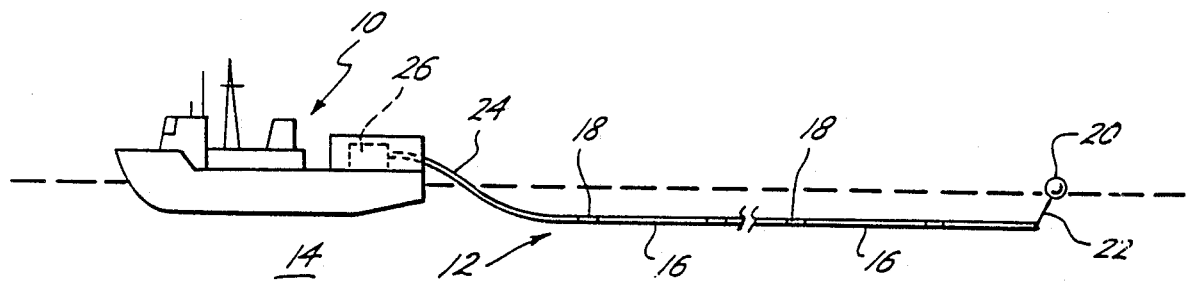
FIG. 1 is a generalized illustration of a ship towing the instant invention through a body of water.

In the following detailed description and corresponding figures, like reference numerals will indicate like components, wherein FIG. 1 generally illustrates a ship 10 towing a streamer cable 12 through a body of water 14. Streamer cable 12 may be of any desired length up to 3 kilometers or more. The length of the streamer cable 12 may be changed by adding or subtracting cable sections 16 interconnected to each other by connectors 18. The distal end of the streamer cable 12 with respect to the ship 10, may have a positioning buoy coupled thereto by a length of cable 22 so that the location of the cable end may be determined visually, by radar or other positioning system known in the art. The proximal or near end of the streamer cable may be connected to the ship 10 by a lead-in cable section 24, which in turn is operably connected through a reel to a recording and control unit 26.

Figure 2:
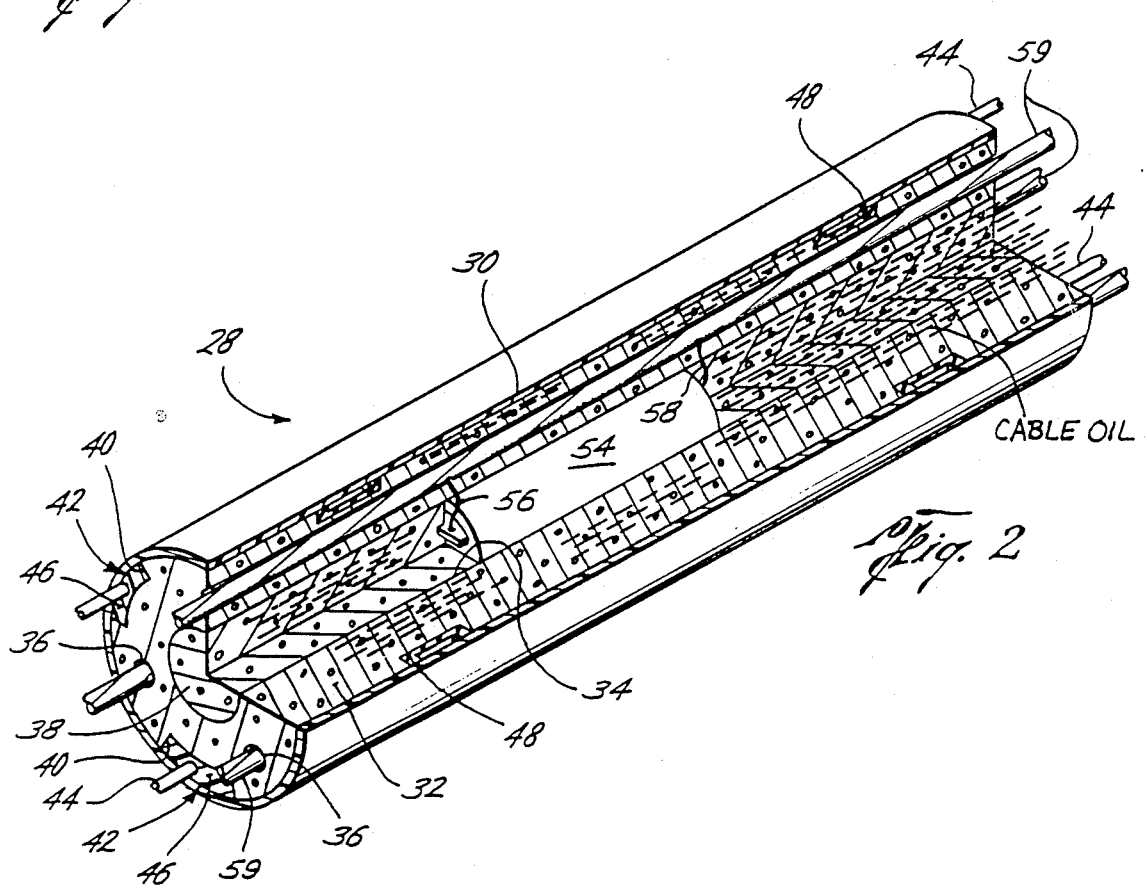

FIGS. 2 and 3 are an isometric view of a streamer cable segment 28 representative of any one of the cable sections 16. Segment 28 is shown in quarter section to reveal the interior components. In one embodiment of the inventive streamer cable, each cable section 16 may be comprised of a tubular outer jacket 30 enclosing a foam-core 32 and 33. It is preferred that core 32 have an open-cell construction with approximately 30 cells per linear inch and extruded as a single piece. The core 32 may be made from a polyurethane having a specific gravity substantially equal to 0.9 grams per cubic centimeter (gm/cm$^3$), but other plastics may be used having essentially the same properties. The transverse shape of the core may vary but FIG. 2 illustrates generally a cylindrical shape having an axial hole 34 and three off-axial holes 36 running the length of the member. The holes are preferably cut into the core 32 during the extrusion process. A cylindrical plug 38 cut from the axial hole 34 remains therein while the off-axial cylindrical pieces may be removed. Defined along the exterior of core 32 may be a plurality of longitudinal channels 40 equidistant from each other. FIG. 2 illustrates three such channels, each located along the exterior at approximately 120 degrees from each other and positioned between the off-axial holes 36. Core 32 and plug 38 are easily cut to the desired length by scissors or a hot knife. The open-cell foam core 32 extends substantially the length of a cable section 16.

Refer to FIG. 3. Located at either end of the cable section 16 between the cable connector 18 and the open cell core 32 is a closed-cell core 33. The length of the core insert 33 may vary, depending upon the weight of the cable at the connectors. The purpose of the closed-cell foam is to provided the proper amount of buoyancy to that portion of the cable proximate the connectors. The shape of the core 33 and the location of the holes in the closed cell foam are the same as in the open cell foam.

Extending the length of each cable section 16 and received within each channel 40 of core 32 and 33 are stress members 42. Each stress member may be comprised of a twisted steel or nylon cable 44 within an extruded thermoplastic rubber shell 46. The shell 46 is preferably extruded directly over cable 44 in a shape so as to fit snugly within channel 40 inside jacket 30. For the purposes of example only the shape of the stress member may be oval or a curved rectangle. The stress members 42 are maintained in radial relationship to each other by a locator 48 shown in FIG 4. Each locator 48 may be a plastic ring 50 molded from a polycarbonate blend to conform to the interior of jacket 30. The exterior of the locator may have channels 52 which align with channels 40 in the foam inserts.

Disposed within axial hole 34 in the foam 32 at predetermined intervals along the cable section 16 may be a plurality of pressure sensors such as 54 shown in FIG. 2. It is preferred that a predetermined portion of the foam plug 38 be removed at these intervals and the sensors inserted. Each sensor 54 may be operably coupled to a predetermined set of conductors 56 and 58 comprising a portion of one of the transmission bundles 59 extending the length of the cable section through the off-axial holes 36. It is preferred that no sensors be located within the closed cell foam insert, however other electronic packages may be contained therein.

FIG. 5 is an isometric view in partial cross section of a preferred pressure sensor 54. In the figure, the pressure sensor 54 may by comprised of a piezoelectric transducer 60 such as a WM2-036 hydrophone manufactured by the assignee of this invention, however other hydrophones may also be employed. The hydrophone is preferably disposed within an axial hole 62 of a cylindrical housing 64 having an outside diameter substantially greater than the diameter of axial hole 34. Housing 64 also is preferably molded from polyvinylchloride (PVC) to form a resilient capsule. The hydrophone may be centrally located and retained within the hole 62 by a plurality of lugs or mounts 66 mounted to the hydrophone 60. Although piezoelectric hydrophones are disclosed other types of sensors such as fiber optic transducers or accelerometers may be used.

After all the components have been physically located with the polyurethane cable jacket 30 and sealed by the connectors 18 at each end, a cable oil such as light kerosene is added [(not shown)]. The streamer cable 12 may be deployed and towed behind the ship 10 in the normal manner. Acoustic waves generated by a nearby source and reflected from subsurface layers of the earth impinge upon the streamer cable and are [transferred] detected by the sensors 54 [by the enclosed cable oil]. The sensors 54 convert the received pressure pulse or pulses to electrical or optical signals which are transmitted through the bundles 59 to the recording and control unit 26.

Cable noise typically associated with conventional cables is radically reduced. Tube waves generated by cable jerk within the cable are dispersed and dissipated by the polyurethane foam interior. The tube-wave energy is greatly reduced or absorbed by the many small scale interferences of the tube wave with itself resulting from the many collisions with the open cell network. Each cell in the core 32 acts to redirect a fraction of each tube wave so as to collide with another fraction thus preventing the tube wave to propagate and be detected by the sensors 54. Any tube wave noise that may reach sensors 54 is again reduced because of the absorbing tendency of the PVC housing 64 surrounding the transducer 60 Tube-wave noise originating near a sensor 54 may be reduced by being directed around the transducer by the conical ends 68 and 70 of housing as well as being absorbed by the PVC from which it is made. As mentioned earlier, it is preferred that the cylindrical housing 64 be made of PVC. This is because we found PVC has a greater characteristic for absorbing noise within the frequency spectrum of interest than any other materials tested; however, this is not to say that better materials do not exist. Noise associated with cable whip and/or vibration is also radically reduced because the stress members provide flexural rigidity to the length of the cable reducing the transverse whipping motion. Vibration of the cable stress member is additionally damped by the thermoplastic rubber shell extruded thereabout, adding flexural rigidity to the cable section. Noise generated from vibration or cable whip may develop is also absorbed by the polyurethane open cell foam interior.

The closed cell foam disposed at the ends of the cable sections provide buoyancy at the cable connections. Without the closed cell foam, the weight of the connectors and electronic modules depress that portion of the streamer cable. The middle of the cable section, being more buoyant than the cable ends, has a tendency to float. Thus the profile of the streamer cable would have a wave or undular profile. To correct this profile, lead weights and dive planes are used to cause the streamer cable to be towed at a common depth. These external devices produce external cable noise which is undesirable.

For illustrative purposes, our invention has been described with a certain degree of specificity. Variations will occur to those skilled in the art but which may be included within the scope and spirit of this invention which is limited only by the appended claims.

I claim as my invention:

1. A streamer-cable assembly, comprising:
   (a) a streamer cable jacket having a first and a second end;
   (b) first and second means disposed within said cable jacket for providing buoyancy to the streamer-cable assembly;
   (c) first and second means disposed within the jacket for damping internally-propagating tube waves, the second means comprising a resilient tubular capsule axially disposed within the first means;
   (d) means disposed within the jacket and adjacent the damping means for reducing lateral movement of the streamer-cable;
   (e) a first and a second connector sealing the first and second end of the cable jacket and each connected to the means for reducing lateral movement of the streamer cable;
   (f) means for detecting transient pressure pulses disposed within the damping means at predetermined intervals; and
   (g) means extending through the damping means and interconnecting the first and second connector for operably coupling the detecting means to a recording and control unit.

2. A streamer-cable assembly, comprising:
   (a) a streamer-cable jacket;
   (b) first and second means disposed within the streamer-cable jacket for damping internally-propagating tube waves, the first means being a resilient tubular capsule axially disposed within the second means;
   (c) means disposed within the streamer-cable jacket and adjacent the first damping means for reducing tensional stress and providing longitudinal flexural rigidity to the streamer cable to reduce cable-whip and vibration;
   (d) means disposed within the first and second damping means for detecting transient pressure pulses; and
   (g) first and second means disposed within the cable-jacket for providing buoyancy to the streamer cable when deployed in a body of water.

3. A streamer-cable assembly as recited in claim 2 wherein the means for reducing tensional stress and providing longitudinal flexural rigidity to the streamer cable comprises:
   (a) a plurality of rigid stress members longitudinally disposed within the streamer-cable jacket; and
   (b) means disposed within the streamer-cable jacket at intervals for maintaining the stress members equidistant from each other.

4. A streamer-cable assembly as recited in claim 3, wherein each of the plurality of stress members comprises:
   (a) a cable; and
   (b) a substantially rigid shell surrounding the cable and extending the length thereof.

5. A streamer-cable assembly as recited in claim 2, wherein the means for detecting transient pressure pulses comprises a plurality of pressure sensors disposed within the damping means at predetermined intervals.

6. The seismic-streamer cable recited in claim 2, further comprising means for operably interconnecting the means for detecting transient pressure pulses to a recording and control unit.

7. A seismic-streamer cable, comprising:
   (a) a cable jacket;
   (b) an open-cell foam core substantially filling the jacket for damping internally-propagating tube waves;
   (c) a plurality of stress members disposed in and extending the length of the jacket for absorbing tensional stress and providing longitudinal flexural rigidity to the seismic-streamer cable;
   (d) a plurality of seismic sensors, each enclosed within a capsule and axially disposed within the foam core, for detecting transient pressure pulses, the plurality of sensors interconnected to a remote recording device; and
   (e) buoyancy means within the cable jacket for providing neutral buoyancy to the seismic-streamer cable while deployed in a body of water.

8. The seismic streamer-cable as recited in claim 7, wherein each of the plurality of stress members comprises:
   (a) at least one strand of wire; and
   (b) a substantially rigid shell extruded about the strand and extending the length of the streamer-cable assembly for providing longitudinal rigidity to the cable assembly.

9. The seismic streamer-cable as recited in claim 7, wherein each of the plurality of stress members, comprises:
   (a) at least one strand of rope; and
   (b) a substantially rigid shell extruded along the length of the strand and extending the length of the streamer-cable assembly for adding flexural rigidity to the length of the streamer-cable assembly.

10. The seismic streamer-cable as recited in claim 9, wherein the substantially rigid shell has a generally oblate cross section perpendicular to the length of the stress member.

11. The seismic streamer-cable as recited in claim 7, wherein the flexible open-cell foam core may have between 10 and 100 cells per linear inch.

12. The streamer-cable assembly as recited in claim 11, further comprising means disposed within the tubular cable jacket at predetermined intervals for maintaining the stress members equidistant from each other.

13. The seismic streamer-cable as recited in claim 7, wherein the plurality of pressure sensor are a plurality of piezoelectric transducers.

14. The seismic streamer-cable as recited in claim 7, wherein the plurality of pressure sensors are a plurality of fiber-optic pressure transducers.

* * * * *

UNITED STATES PATENT AND TRADEMARK OFFICE
CERTIFICATE OF CORRECTION

PATENT NO.   :   4,955,012
DATED        :   SEPTEMBER 04, 1990
INVENTOR(S)  :   Alan D. McMurry It is certified that error appears in the above—identified patent and that said Letters Patent is hereby corrected as shown below:

On the Title Page, after the heading "Inventors:" the names Steven W. Bledsoe and Alan D. McMurry should read only the name "Alan D. McMurry."

Signed and Sealed this

Eighteenth Day of December, 1990

Attest:

HARRY F. MANBECK, JR.

*Attesting Officer*     *Commissioner of Patents and Trademarks*